US012393430B2

(12) United States Patent
Banik et al.

(10) Patent No.: US 12,393,430 B2
(45) Date of Patent: Aug. 19, 2025

(54) METHODS AND APPARATUS TO INCREASE BOOT PERFORMANCE BY CATEGORIZING BOOT TASKS

(71) Applicant: Intel Corporation, Santa Clara, CA (US)

(72) Inventors: Subrata Banik, Bangalore (IN); Rajaram Regupathy, Bangalore (IN); Vincent Zimmer, Issaquah, WA (US); Julius Mandelblat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 17/482,201

(22) Filed: Sep. 22, 2021

(65) Prior Publication Data
US 2022/0012062 A1    Jan. 13, 2022

(51) Int. Cl.
*G06F 9/4401* (2018.01)
*G06F 11/34* (2006.01)

(52) U.S. Cl.
CPC ........ *G06F 9/4405* (2013.01); *G06F 11/3495* (2013.01)

(58) Field of Classification Search
CPC ........ G06F 9/44; G06F 9/4401; G06F 9/4405; G06F 9/445; G06F 9/44505; G06F 9/44521
See application file for complete search history.

(56) References Cited

U.S. PATENT DOCUMENTS

| 5,949,415 | A  | * | 9/1999  | Lin   | G06F 11/3476 |
|           |    |   |         |       | 715/740 |
| 8,868,891 | B2 | * | 10/2014 | Chen  | G06F 9/4401 |
|           |    |   |         |       | 710/10 |
| 11,593,123 | B2 | * | 2/2023 | Ho    | G06F 9/4406 |
| 11,941,409 | B2 | * | 3/2024 | Banik | G06F 12/084 |
| 12,079,612 | B2 | * | 9/2024 | Banik | G06F 9/4843 |

(Continued)

FOREIGN PATENT DOCUMENTS

WO    2010090636    8/2010

OTHER PUBLICATIONS

European Patent Office, "Communication Pursuant to Article 94(3) EPC," issued in connection with European Patent Application No. 22191516.8-1203, dated Jan. 31, 2024, 5 pages.

(Continued)

*Primary Examiner* — Raymond N Phan
(74) *Attorney, Agent, or Firm* — HANLEY, FLIGHT & ZIMMERMAN, LLC

(57) ABSTRACT

Methods, apparatus, systems, and articles of manufacture to increase boot performance are disclosed. An example apparatus including instructions stored in the apparatus; and processor circuitry to execute the instructions to: during a boot process: identify a boot task that is to be performed during the boot process; execute the boot task using a first processor component; collect data corresponding to the execution of the boot task on the first processor component; categorize the boot task based on the collected data; and generate an entry for a boot table based on the categorization, the boot table used to schedule the boot task on at least one of the first processor component or a second processor component different than the first processor component based on the categorization.

24 Claims, 9 Drawing Sheets

(56) References Cited

U.S. PATENT DOCUMENTS

| | | | |
|---|---|---|---|
| 2011/0283098 A1* | 11/2011 | Gillespie | G06F 9/4401 |
| | | | 713/2 |
| 2013/0132708 A1* | 5/2013 | Kurihara | G06F 15/80 |
| | | | 712/42 |
| 2015/0106609 A1* | 4/2015 | Koszek | G06F 9/4405 |
| | | | 713/1 |
| 2020/0410389 A1 | 12/2020 | Jain et al. | |
| 2021/0089296 A1 | 3/2021 | Banik et al. | |

OTHER PUBLICATIONS

European Patent Office, "Exented European Search Report," issued in connection with Application No. 22191516.8, dated Jan. 23, 2023, 9 pages.

European Patent Office, "Communication under Rule 71(3) EPC—Intention to Grant," issued in connection with European Patent Application No. 22191516.8-1203, dated Sep. 20, 2024, 61 pages.

* cited by examiner

METHODS AND APPARATUS TO INCREASE BOOT PERFORMANCE BY CATEGORIZING BOOT TASKS

FIELD OF THE DISCLOSURE

This disclosure relates generally to computing systems and, more particularly, to methods and apparatus to increase boot performance.

BACKGROUND

Basic Input/Output System (BIOS) is firmware of a computing system that executes tasks to perform hardware initialization during a booting process (e.g., during startup, a firmware-update, etc.) and provides services to an operating system of the computing system during runtime. During a boot process, the BIOS initializes and test the hardware components of a computing system. Some computing systems utilize extensible firmware interface (EFI), unified extensible firmware interface (UEFI), or other firmware to perform initialization and/or provide runtime services.

DETAILED DESCRIPTION

Figure 1:
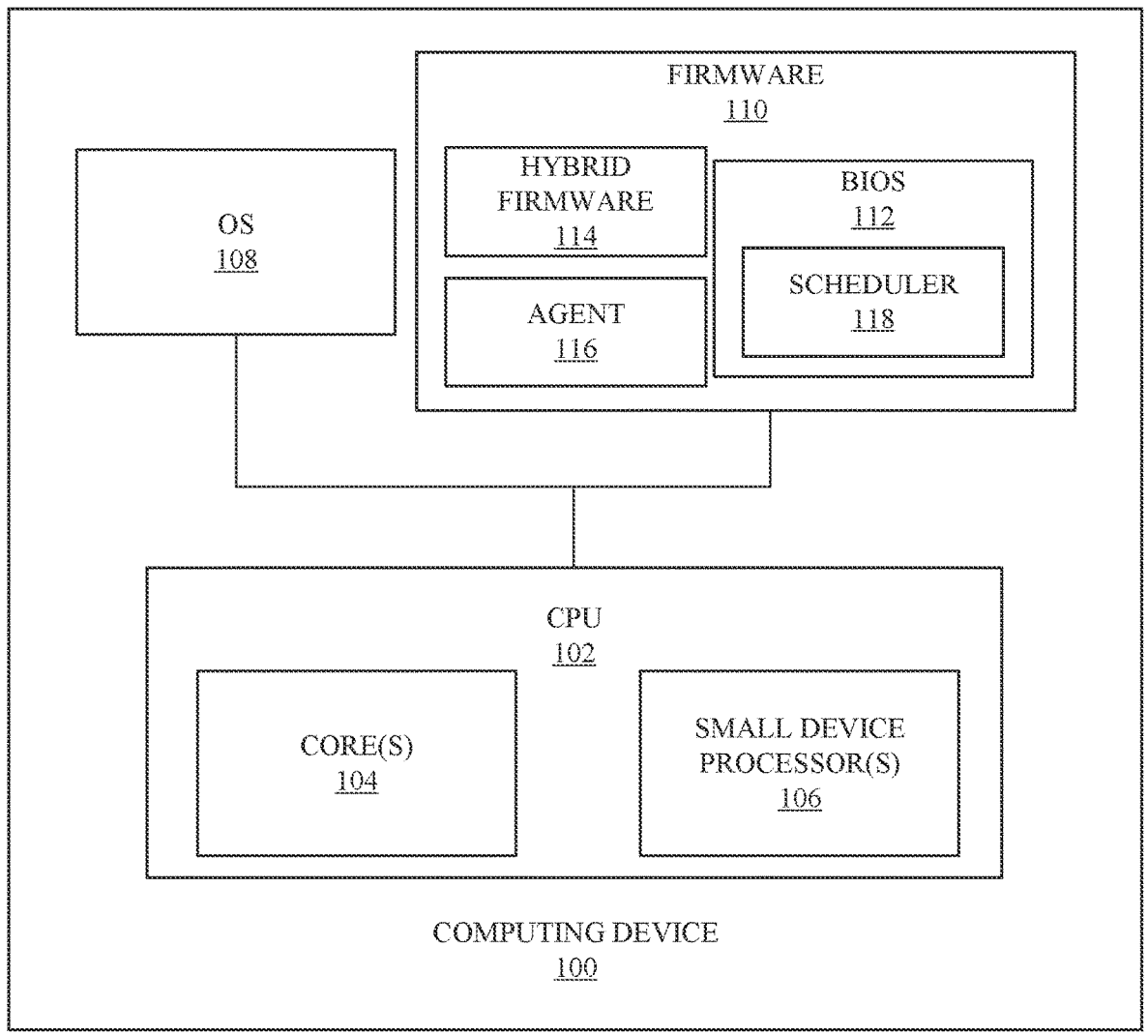
FIG. 1 is a block diagram of an example computing device.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Some entities (e.g., cloud service providers) provide services (e.g., compute-as-a-service (CaaS)) to computing devices of users (e.g., computers, laptops, servers, virtual machines, etc.). Initially, the entity may provide (e.g., deploy) software, instructions, commands, etc., that may be implemented at the computing device of a user. However, as the entity generates updated software, instructions, patches, etc., the entity may deploy updates to the computing devices to update the computing system.

Traditionally, when an update from an entity includes or is based on a firmware update (e.g., updating the configuration of firmware at the computing device), a computing device performs a full reboot to install the firmware update. During a full reboot, the operating system of the computing device shuts down and restarts all the processes and/or components of the computing device (e.g., including hardware drivers, kernels etc.) by interacting with the Basic Input/Output System (BIOS). The BIOS is firmware that performs hardware initialization during power up and/or booting the computing device by performing tasks (e.g., boot tasks) on processing components of the computing device (e.g., cores, big cores, little cores, atoms, big device processor, little device processor, etc.). Boot protocols and/or firmware updates may be vital to the performance and/or security of the computing device.

Heterogeneous technology in computing systems are computing systems that include more than one type of core. For example, a computing system may have one or more big device processor (e.g., cores) and/or one or more small device processors (e.g., atoms) to perform operations. A big device processor may include one or more cores and/or processing units while a small device processor may have one or two cores. Additionally, the big processor device is more power and/or takes up more space than a small processor device. A big device processor can handle high performance applications while a small device processor offers lower power, smaller footprint, and more modest performance compared to bit device processors. Examples of small device processors include Intel® Atom®, Intel® Quark® SoC, LITTLE cores, etc. Heterogeneous systems provide compact, powerful, and efficient computing systems. Examples disclosed herein leverage heterogeneous computing systems to increase the speed and efficiency of a BIOS controlled boot (e.g., for startup, firmware updates, low power boot mode, S5 charging, etc.).

Some traditional BIOS boot protocols utilize a boot strap processor (BSP) and/or controller in a single threaded and/or multi-threaded environment without analyzing the speed, energy, performance efficiency, etc. of the processing component (e.g., core, small device processor, thread etc.), thereby resulting in more idle time for the boot protocol. Additionally such traditional BIOS boot protocols do not differentiate tasks with respect to the processing components running the tasks. For example, traditional BISO protocols obtain a task and assign the task to the next available processing component (e.g., core/thread/small device processor) without determining if the task is better suited to a particular processing component. For example, assigning a task to a small device processor is more efficient than assigning the task to the core. However, the amount of time it takes for an small device processor to perform a task is longer than for a core.

Examples disclosed herein categorize boot tasks into task types and/or processing component types based on performance metrics to balance the speed and efficiency of different processing components of a computing system. For example, more computationally intensive tasks may be linked to cores while less computationally intensive tasks are linked to small device processors. Examples disclosed herein categorize the boot tasks into one of four types: a compute bound task, a cache bound task, a memory bound task, and/or an I/O bound task. Additionally or alternatively, examples disclosed herein may categorize tasks into additional and/or alternative task types. As an example, a compute bound task may be a task that performs computations and/or calculations (e.g., multiplying small matrices), a cache count task may be a task that processes more data than fits in the cache, a memory bound task may be a task that processes large amounts of memory data (e.g., multiplying large matrices), and an I/O bound task may be a task that processes data from a disk (e.g., counting the number of lines in a file).

Examples disclosed herein categorize boot tasks using firmware agents that monitor the performance of the boot tasks during a boot protocol (e.g., during a learning phase) and identify the compute task category and/or an appropriate processor component based on the performance. The agents store the classifications (also referred to as categorizations) to a learning boot table. After the training phase, when control is passed to the BIOS (e.g., during startup, during a firmware update, etc.), a scheduler utilizes the learning boot schedule to instruct the tasks to be performed on the processing component identified in the learning boot table. For example, the scheduler may schedule compute bound tasks and/or memory bound tasks to be performed by a first processing component (e.g., a core, a BIG core, etc.) while the cache bound tasks and/or IO based tasks are scheduled to be performed on a small device processor (e.g., an atom, a LITTLE core, etc.). Using examples disclosed herein, the boot process is faster and more efficient.

FIG. 1 is a block diagram of an example computing device 100. The example computing device 100 includes an example CPU 102, which includes one or more example cores 104 and one or more example small device processors 106. The example computing device 100 further includes an example operating system (OS) 108 and example firmware 110. The example firmware 110 includes an example BIOS 112, example hybrid firmware 114, example agent 116, and example scheduler 118.

The example CPU 102 of FIG. 1 is electronic circuitry that executes instructions making up a program or workload. The CPU 102 may be an embedded system, a field programmable gate array, a shared-memory controller, a network on-chip, a networked system, and/or any other circuitry that includes a hardware (e.g., semiconductor based) processor, memory, and/or cache. The example CPU 102 utilizes processor resources (e.g., memory, register(s) and/or logic circuitry of the example processor core(s) 104 and/or atom(s) 106) to execute instructions to implement an application and/or access data from memory. In some examples, the CPU 102 includes circuitry to execute firmware instructions. For example, the CPU 102 may include agent circuitry to execute the example agent 116 and/or scheduler circuitry to execute the scheduler 118.

The example processor core(s) 104 and/or the example small device processor(s) 106 of FIG. 1 execute(s) instructions (e.g., a workload) from an application (e.g., by reading and/or writing data). Tasks executed on one or more core(s) 104 may result in a different amount of time to complete and/or a different efficiency than the same tasks being executed on the one or more small device processors 106. For example, the one or more cores 104 may be more efficient with respect to iterations per cycle (IPC) ratios when executing compute-bound tasks. Additionally, the one or more cores 104 may have a larger cache than the small device processors 106 for executing cache bound tasks. The one or more small device processors 106 may be more efficient for memory-bound tasks that correspond to more time in pipe stall waiting for memory and/or may be more efficient for 110 bound tasks, as IO bound tasks do not depend on processing operating speed. Although the example CPU 102 includes the core(s) 104 and the small device processor(s) 106, the CPU 102 can include any number and/or type of processing components (e.g., little core, big core, threads, etc.). Examples of small device processors 106 include Intel® Atom®, Intel® Quark® SoC, LITTLE cores, etc.

The example OS 108 of FIG. 1 is a software system managing the example CPU 102 to manage hardware of the computing device 100, software resources, and/or provides servers for computer programs and/or applications. During a boot process (e.g., at start-up, a firmware update, etc.), the OS 108 passes control of the computing device 100 to the firmware 110 (e.g., the BIOS 112). After the boot process, control is passed back to the OS 108 for normal operation.

The example firmware 110 of FIG. 1 provides low-level control over the hardware of the computing device 100. The example firmware 110 includes the BIOS 112 to use the example core(s) 104 and/or small device processor(s) 106 to execute instructions and/or perform operations during a boot protocol. The BIOS 112 can perform hardware initialization and/or provide runtime services for the OS 108 and/or other programs. Additionally, the BIOS 112 can perform tasks during a firmware update and/or any other boot protocol, where the BIOS 112 has control of the core(s) 104 and/or small device processor(s) 106. Although the example computing device 100 of FIG. 1 includes the BIOS 112, the BIOS 112 can be replaced with EFI, UEFI, and/or any other type of firmware that is capable of interfacing between hardware and the OS 108.

The example hybrid firmware 114 of FIG. 1 deploys the agent 116 and/or the scheduler 118 into the firmware 110. For example, during a training phase (e.g., during an initial boot, when a learning table is not authenticated, and/or during retraining), the hybrid firmware 114 deploys the agent 116 to initialize the categorization of boot tasks to generate a learning boot table based on the nature of the tasks. The example agent 116 analyzes boot tasks and/or obtains performance data of the boot tasks when executed by the core(s) 104 and/or the small device processor(s) 106 to be able to categorize the boot tasks (e.g., into the nature of the task, such as compute bound, memory bound, IO bound, and/or cache bound) in a learning boot table. The agent 116 is further described below in conjunction with FIG. 3. The hybrid firmware 114 instruct the agent 116 on how to implement the training protocol to gather information for the categorization of the boot tasks. For example, the hybrid firmware 114 cause the agents circuitry 116 to run a boot task on one or more of the core(s) 104 and/or small device processor(s) 106 to obtain performance data for the categorization of the coot task. After training and/or during a subsequent boot process, the hybrid firmware 114 deploys the scheduler 118 to schedule the tasks based on the learning boot table. For example, during a boot, the scheduler identifies the boot tasks of the boot protocol, identifies the corresponding categorization, and schedules the task to be executed by one of the core(s) 104 or the small device processor(s) 106 based on the categorization. The example scheduler 118 is further described below in conjunction with FIG. 3.

Figure 2:
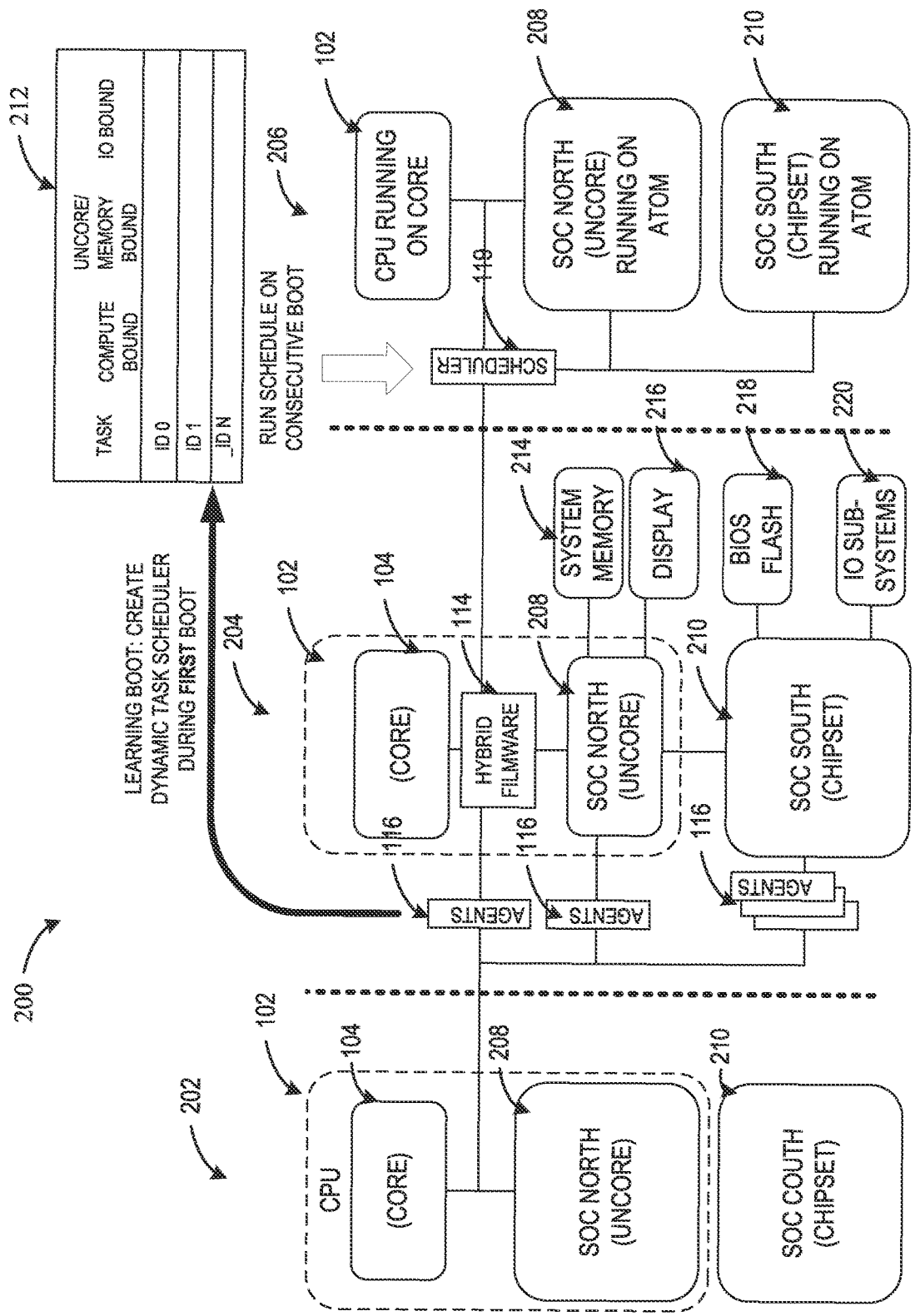
FIG. 2 illustrates an example heterogenous processor boot with a hybrid firmware model.

FIG. 2 illustrates an example heterogenous processor boot diagram 200 with a hybrid firmware model. The example heterogenous processor boot diagram 200 includes the example CPU 102, the example core(s) 104, the example hybrid firmware 114, the example agent 116, and the example scheduler 119 of FIG. 1. The example heterogeneous processor boot diagram further includes an example hardware view 202, an example firmware view 204, an example CPU view 206, an example system on chip (SOC) north (e.g., also referred to as uncore) 208, an example SOC south (e.g., also referred to as a chipset) 210, an example learning boot table 212, example system memory 214, an example display 216, an example BIOS flash 218, and example IO subsystems 220.

The example core 104 running on the CPU 102 can be utilized to perform tasks that focus on operating speed (e.g., arithmetic operations). The SoC north 208 requires large amount of memory data and does not depend on processing operating speed. For example, the SOC 208 may copy master boot record from block devices into the memory 214 and use the same for booting to the OS 108 or split boot wherein portion of the BIOS 112 is expected to run from inactive boot partitions because higher memory is available to copy the data into memory and run from the memory 214. In absence of memory and/or when memory availability is limited, the SOC north 208 may rely on cache. Prior to DRAM initialization in the computing device 100, all BIOS tasks may be dependent on cache. The IO chipset/SOC south 210 can be used to focus on IO subsystem and deal with chipset registers (e.g., read from block device, updating firmware on IO sub-systems, etc.).

As described above, the example hybrid firmware 114 deploys the agent 116 to generate the learning boot table 212 and/or the scheduler 119 use the learning boot table 212 to schedule boot tasks on the core(s) 104 and/or small device processor(s) 106 during a boot protocol. In some examples, the example CPU 102 may implement the agent 116 by executing software and/or firmware using agent circuitry and may implement the scheduler 119 by executing software and/or firmware using scheduler circuitry. In some examples, the agent 116 and/or the scheduler 119 be hardware structured to perform specific functions. When the agent 116 is deployed, the example agent 116 gathers information related to boot tasks to be able to classify the boot tasks. For example, the agent 116 may gather task identifiers, performance information of the tasks executed on the core(s) 104 and/or the small device processor(s) 106, time to execute, and/or information from hardware agents. Hardware agents facilitate the boot tasks using the hardware. Accordingly, hardware agents may be able to determine whether a task is a memory bound task, and IO bound task or a cache task and provide this information (e.g., operational data) to the agent 116. The example agent 116 categorizes the task(s) based on the obtained information. For example, the agent 116 uses the performance data (e.g., IPC), timestamps, and/or information (e.g., operational data) from the hardware agents to classify the tasks. For example, a task (e.g., encryption operation based on a memory buffer), may include both computational and memory components. Accordingly, the agent 116 may use the timestamp and performance to categorize the task as compute bound or memory bound.

The agent 116 of FIG. 1 may gather information from a single boot (e.g., for static scheduling) and/or multiple boots (for dynamic scheduling) to generate the learning boot table 212. If the agent 116 generates the learning boot table 212 based on static scheduling, the agent 116 categorizes each task to a corresponding task category (e.g., compute bound, memory bound, IO bound, cache bound) to generate the learning boot table 212. If the agent 116 generates the learning boot table 212 based on dynamic scheduling, the agent 116 causes a task to be run on different processor components and compares the results to link the task to a processor component. For example, during a first boot, the agent 116 may obtain information related to the task being performed on one of the core(s) 104. During a second boot, the agent 116 may cause the task to be performed on a different one of the core(s) 104 and/or one of the small device processor(s) 106. In this manner, the agent 116 can compare the performance and/or timing of the task operating on the two different components to determine which processor component is better (e.g., with respect to performance, efficiency, and/or timing, depending on user and/or manufacturer preferences). Accordingly, the agent 116 may generate an entry in the learning boot table 212 that identifies a task identifier, a corresponding task classification and/or category (e.g., compute bound, memory bound, IO bound, cache bound, etc.) for static scheduling, and/or a corresponding processing component type (e.g., core, small device processor, etc.) for dynamic scheduling. Although examples disclosed herein describe the example learning boot table 212 being generated locally in the computing device 100 by the agent 116, the learning boot table 212 may be generated externally (e.g., at a different computing device and/or server) and deployed to the example computing device 100 for the scheduler 118 to use.

After the learning boot table 212 of FIG. 2 is generated, the learning boot table is stored in non-volatile memory. During a subsequent boot, the scheduler 119 uses the information of the learning boot table 212 to schedules boot tasks on processing components based on the corresponding information of the boot table 212. For example, if the scheduler 119 applies static scheduling (e.g., because dynamic scheduling information is not available or based on a setting), the scheduler 119 identifies a boot task that is to be performed. After identification, the scheduler 119 identifies the classification and/or category corresponding to the task in the learning boot table 212 based on a task identifier of the task. After the classification and/or category of the task is identified, the scheduler 119 schedules the task on one of the core(s) 104 and/or small device processor(s) 106 based on the categorization (e.g., compute bound and/or cache bound tasks on the core(s) 104 and memory and/or IO bound tasks on the small device processor(s) 106). If the scheduler 119 applies dynamic scheduling, the scheduler 119 identifies a boot task that is to be performed. After identification, the scheduler 119 identifies the processor component corresponding to the task in the learning boot table 212 based on a task identifier of the task. After the component processor is identified, the scheduler 119 schedules the task on one of the core(s) 104 and/or small device processor(s) 106 corresponding to the identified processor component. Retraining and/or additional training (e.g., for dynamic scheduling) for additional and/or replacement entries for the learning boot table 212 may be performed at any time after the initial boot protocol.

Figure 3:
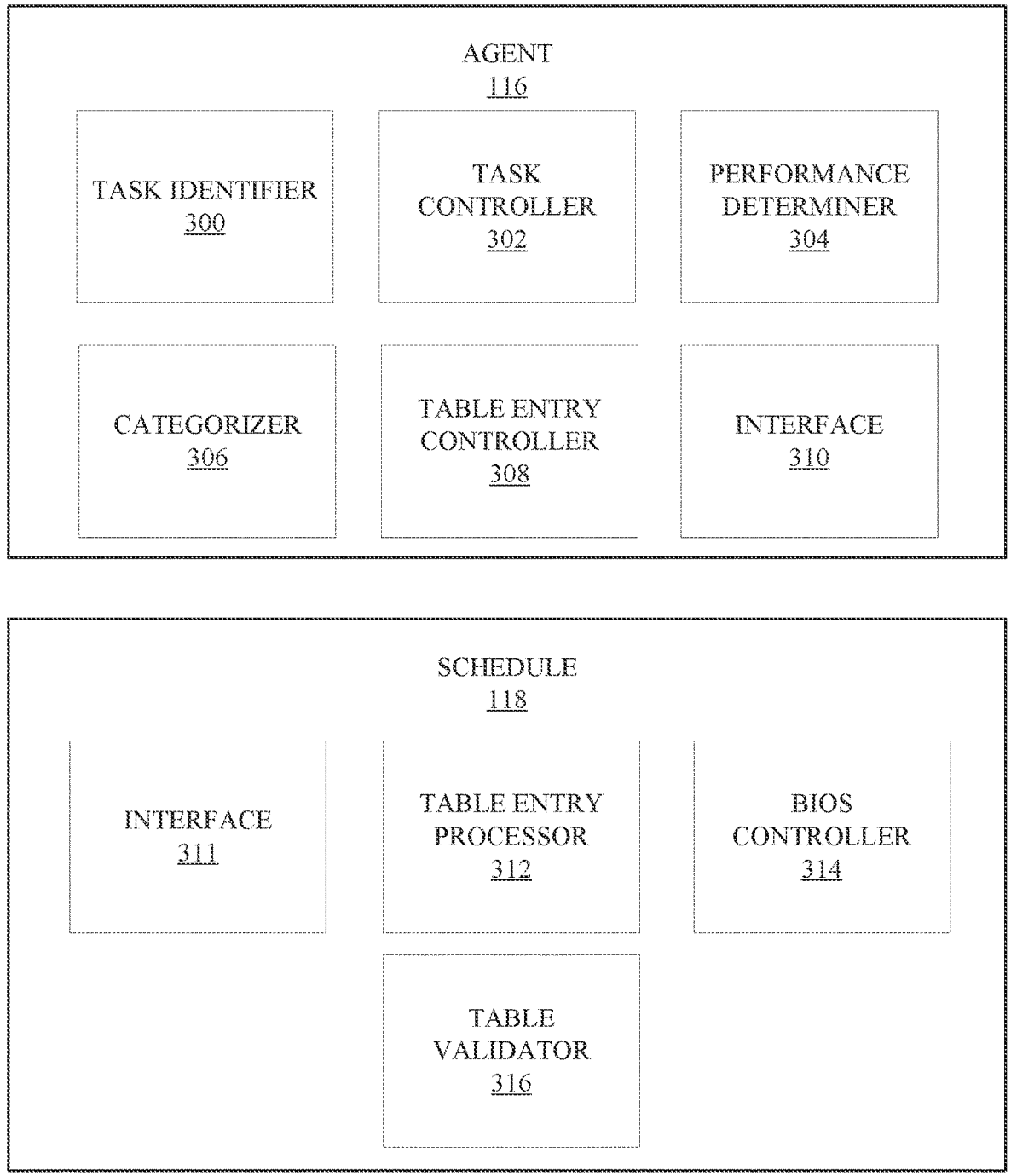
FIG. 3 is a block diagram of an implementation of the example agent and scheduler of FIG. 1.

FIG. 3 is a block diagram of an example implementation of the agent 116 and the scheduler 118 of FIGS. 1 and/or 2. The example agent 116 includes an example task identifier 300, an example task controller 302, an example performance determiner 304, an example categorizer 306, an example table entry controller 308, and an example interface 310. The example task identifier 300, the example task controller 302, the example performance determiner 304, the example categorizer 306, the example table entry controller 308, and/or the example interface 310 may be implemented by the CPU 102 executing software and/or firmware. For example, the CPU may include task identification circuitry to implement the task identifier 300, task control circuitry to implement the task controller 302, performance determination circuitry to implement the example performance determiner 304, categorization circuitry to implement the example categorizer 306, table entry circuitry to implement the example table entry controller 308, and/or interface circuitry to implement the example interface 310. The example scheduler 118 includes an example interface 311, an example table entry processor 312, an example BIOS controller 314, and an example table validator 316. The example interface 311, the example table entry processor 312, the example BIOS controller 314, and/or the example table validator 316 may be implemented by the CPU 102 executing software and/or firmware. For example, the CPU 102 may include interface circuitry to implement example interface 311, table entry processing circuitry to implement the example table entry processor 312, BIOS control circuitry to implement the example BIOS controller 314, and/or table validation circuitry to implement the example table validator 316.

The example task identifier 300 of FIG. 3 identifies and/or assigns a task identifier of a boot task. Each task can be associated with a different identifier. In this manner, the task identifier 300 can ensure that when the task is scheduled during a subsequent boot protocol, the correct categorization will correspond to the same task identified during training. If the task already corresponds to an identifier, the task identifier 300 can identify the task based on the predefined identifier. If the task does not have an identifier, the task identifier 300 can provide an identifier so that the task can be identified during subsequent boot protocols.

The example task controller 302 of FIG. 3 controls how the task is performed. For example, the task controller 302 can cause a task to be run on one of the core(s) 104 or one of the small device processor(s) 106. The task controller 302 may perform the task on the different processing components to be able to confirm that the correct processing component is being used and/or for dynamic scheduling.

The example performance determiner 304 of FIG. 3 determines the performance of a task being executed on one of the core(s) 104 and/or the small device processor(s) 106. For example, the performance determiner 304 can measure the IPC of a task being executed on one of the core(s) 104 and/or the small device processor(s) 106. The performance determiner 304 may additionally or alternatively measure the amount of time a task took to complete on the core(s) 104 and/or the small device processor(s) 106, the power usage and/or any other data related to the performance of the task.

The categorizer 306 of FIG. 3 categorizes the task into a task type and/or a processor component type. For example, during an initial boot processes, the categorizer 306 may use the performance information (e.g., IPC, timestamp, power usage, telemetric data, etc.) and/or information (e.g., operational data) from hardware agents to determine the task type. For example, the categorizer 306 may categorize a task as compute count when the task results in more than a threshold amount of time to compete and/or corresponds to more than a threshold IPC. The categorizer 306 may categorize a task as IO bound when hardware agents provide operational information that the task corresponding to IO operations. Additionally, hardware agents and/or the amount of time to perform that requires memory may be analyzed to determine whether a task is a memory bound task or a cache bound task. Additionally or alternatively, the categorizer 306 may categorize into a processor component time (e.g., core or small device processor), based on the performance information and/or operational information from the hardware agents (e.g., for dynamic scheduling). For example, the task controller 302 may execute a task on one of the cores 104 and one of the small device processors 106 (e.g., during the same boot or during different boots) and compare the performance results. In this manner, the categorizer 306 can determine which component is faster, more efficient, consumes less power resources, etc. based on the comparison of the performance on the core 104 vs. the small device processor 106.

The example table entry controller 308 of FIG. 3 generates information to include in an entry in the learning boot table 212. For example, the table entry controller 308 organizes the task identifier, the task categorization and/or the processor component categorization for the task. The table entry controller 308 adds the entry to the learning boot table 212, which may be stored in volatile memory and/or cache during the boot process. In some examples, the table entry controller 308 and/or another component of the firmware 110 may store the learning boot table into non-volatile memory at the end of the boot process so that the scheduler 118 can utilize the learning boot table 212 during a subsequent boot.

The example interface 310 of FIG. 3 obtains operational information from hardware agents, the core(s) 104, and/or the small device processor(s) 106. For example, the interface 310 can obtain performance information and/or information related to how a task was executed via the hardware agents, core(s) 104, and/or small device processor(s) 106. Additionally, the example interface 310 may transmit the learning boot table 212 and/or an entry for the learning boot table 212 into volatile memory and/or cache to be stored during the boot process.

The example interface 311 of the example scheduler 118 of FIG. 3 obtains the learning boot table 212 from memory when a boot process starts. In this manner, the scheduler 118 can schedule the boot tasks statically and/or dynamically using the learning boot table 212. Additionally, when a boot protocol is initiated, the interface 311 obtains the list of tasks to be executed during the boot protocol.

The example table entry processor 312 of FIG. 3 processes entries in the learning boot table 212 to be able to find information related to a boot task. For example, when a boot protocol is initiated, the table entry processor 312 identifies an identifier of the first obtained task for the boot protocol. After the identifier is obtained, the table entry processor 312 searches for an entry that matches the identifier. If a match is not found, the table entry processor 312 may default the task to one of the core(s) 104 and/or small device processor(s) 106 and/or may instruct the agent 116 to process the task to add to the learning boot table 212. If a match is found, the table entry processor 312 may identify the corresponding task categorization (e.g., for static scheduling) and/or processor core categorization (e.g., for dynamic scheduling) for the task.

The example BIOS controller 314 of FIG. 3 schedules the task based on the task categorization and/or processor component categorization of the tasks to be executed during the boot process. For example, if dynamic scheduling is to be performed, the BIOS controller 314 schedules each task based on the processor component categorization of the tasks in the learning boot table 212 (e.g., the BIOS controller 314 schedules a task classified to a core to be execute by one or more of the core(s) 104 for the boot process). For static scheduling, the BIOS controller 314 schedules a task based on the corresponding task categorization. For example, the BIOS control circuitry can schedule the compute bound tasks and/or the cache bound tasks on the core(s) 104 and schedule the IO bound tasks and/or memory bound tasks on the small device processor(s) 106. Additionally, the BIOS controller 314 may perform a hybrid scheduling, where some of the tasks are statically scheduled and/or some of the tasks are dynamically scheduled (e.g., when all the dynamical information is not yet known, when the core(s) 104 and/or the small device processor(s) 106 are under or over utilized, and/or based on preferences). Additionally, the BIOS controller 314 may schedule the tasks based on an indication that static/dynamic scheduling will be overridden (e.g., due to low available power resources, speed preference, etc.). For example, if the computing device has low battery, the static and/or dynamic scheduling may be overridden, so that the BIOS 112 can operate according to a predefined low power scheduling to conserve power.

The example table validator 316 of FIG. 3 validates the learning boot table 212. In order to avoid an invalid table from being implemented during a boot process, the table validator 316 validates an accessed table prior to use to ensure that the table is safe and/or complete to use during the boot process. The table validator 316 can use any type of data validation technique.

Figure 4:
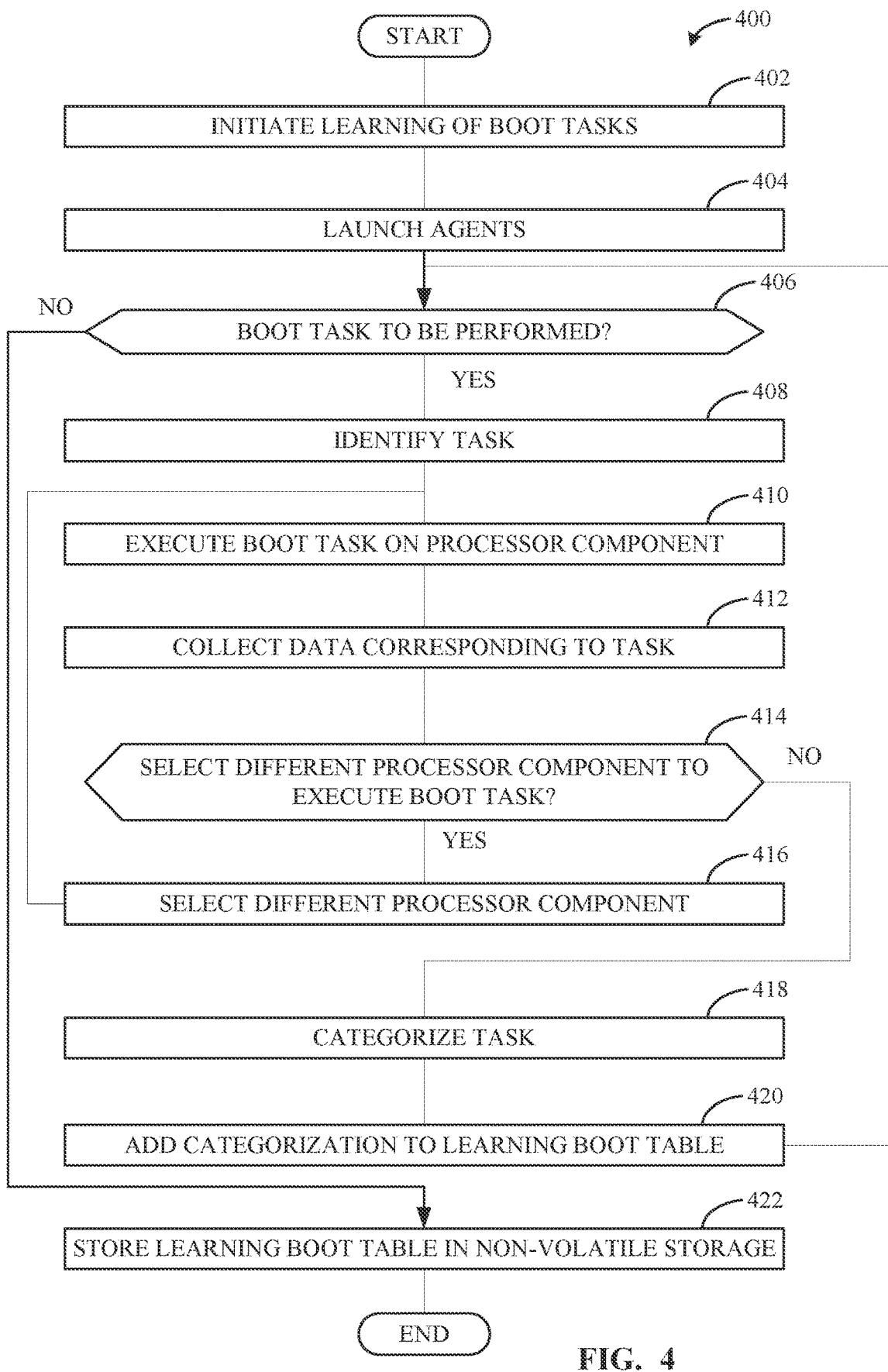
FIG. 4 is a flowchart representative of example machine readable instructions that may be executed by example processor circuitry to implement the agent(s) of FIG. 3.

While an example manner of implementing the agent 116 and/or the scheduler 118 of FIG. 1 is illustrated in FIG. 4, one or more of the elements, processes, and/or devices illustrated in FIG. 4 may be combined, divided, re-arranged, omitted, eliminated, and/or implemented in any other way. Further, the example task identifier 300, the example task controller 302, the example performance determiner 304, the example categorizer 306, the example table entry controller 308, the example interface 310, the example interface 311, the example table entry processor 312, the example BIOS controller 314, the example table validator 316, and/or, more generally, the computing device 100, the example firmware 110, the example BIO 112, the example hybrid firmware 114, the agent 116, and/or the scheduler 118 of FIGS. 1-3, may be implemented by hardware, software, firmware, and/ or any combination of hardware, software, and/or firmware. Thus, for example, any of the example task identifier 300, the example task controller 302, the example performance determiner 304, the example categorizer 306, the example table entry controller 308, the example interface 310, the example interface 311, the example table entry processor 312, the example BIOS controller 314, the example table validator 316, and/or, more generally, the computing device 100, the example firmware 110, the example BIO 112, the example hybrid firmware 114, the agent 116, and/or the scheduler 118 of FIGS. 1-3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the computing device 100, the example firmware 110, the example BIO 112, the example hybrid firmware 114, the agent 116, and/or the scheduler 118 of FIGS. 1-3 is/are hereby expressly defined to include a non-transitory computer readable storage device or storage disk such as a memory, a digital versatile disk (DVD), a compact disk (CD), a Blu-ray disk, etc., including the software and/or firmware. Further still, the computing device 100, the example firmware 110, the example BIO 112, the example hybrid firmware 114, the agent 116, and/or the scheduler 118 of FIGS. 1-3 may include one or more elements, processes, and/or devices in addition to, or instead of, those illustrated in FIGS. 1-3, and/or may include more than one of any or all of the illustrated elements, processes, and devices.

Figure 5:
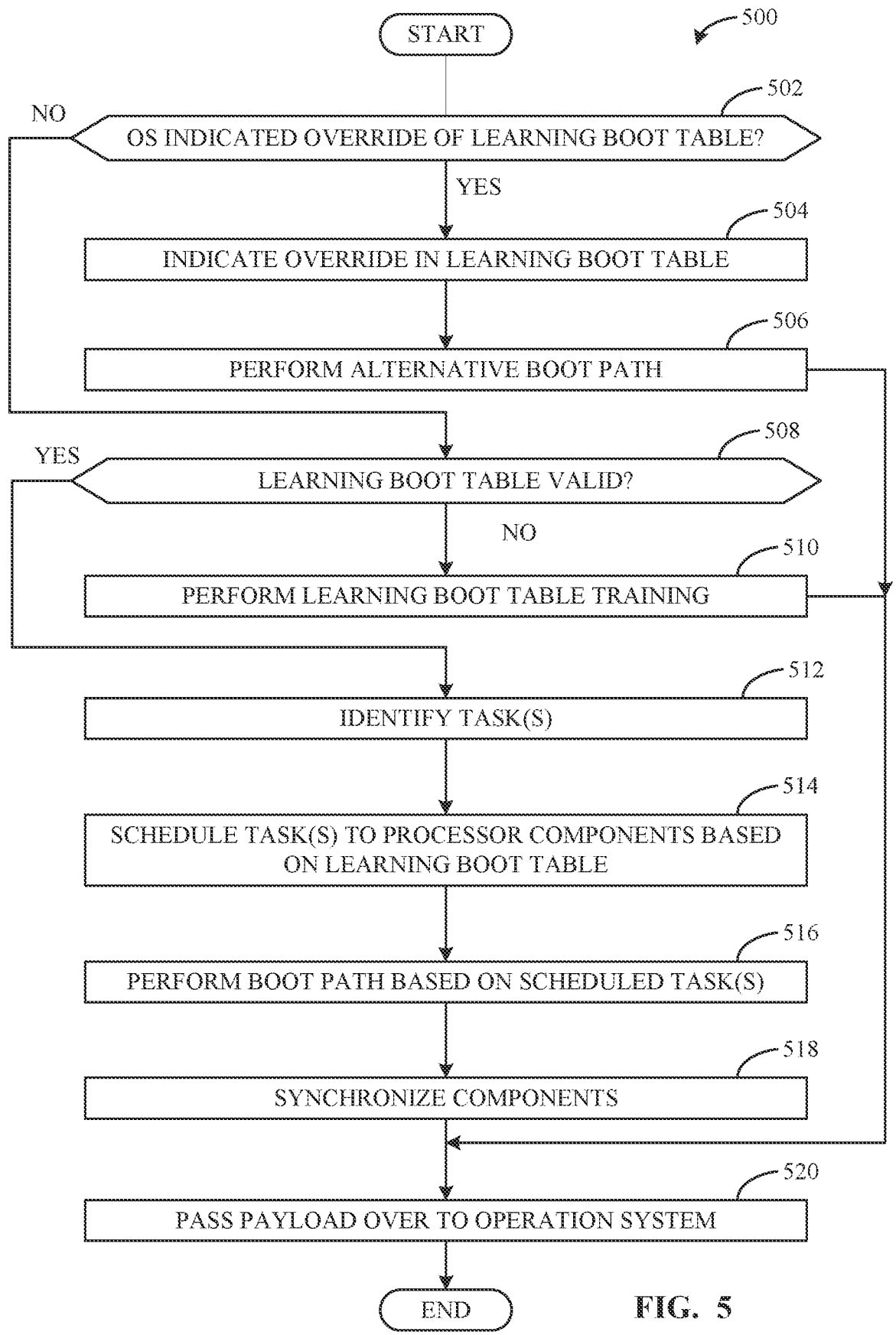
FIG. 5 is a flowchart representative of example machine readable instructions that may be executed by example processor circuitry to implement the scheduler of FIG. 3.

Flowcharts representative of example hardware logic circuitry, machine readable instructions, hardware implemented state machines, and/or any combination thereof for implementing the computing device 100, the agent 116, and/or the scheduler 118 of FIGS. 1-3 are shown in FIGS. 4-5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIG. 6. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the computing device 100, the agent 116, and/or the scheduler 118 of FIGS. 1-3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to generate the example learning boot table 212 during learning. The learning may occur during an initial boot and/or during retraining and/or to gather more information for dynamic scheduling.

The machine readable instructions and/or operations 400 of FIG. 4 begin at block 402, at which the example OS 108 passes control to the example BIOS 112 to initiate the learning of the boot tasks during a boot protocol. At block 404, the example hybrid firmware 114 deploys the agent 116 to control the boot process and obtain data for the categorization of the tasks. At block 406, the example task controller 302 determines if a boot task is to be performed based on the boot protocol.

If the example control circuitry 302 determines that a boot task is not be performed (block 406: NO), control continues to block 422, as further described below. If the example control circuitry 302 determines that a boot task is to be performed (block 406: YES), the example task identifier 300 identifies the task (block 408). For example, if the task includes an identifier, the task identifier 300 processes the task to determine the task identifier. If the task does not include an identifier, the task identifier 300 may generate a task identifier for the task, so that the scheduler 118 and/or the agent 116 can identify the task during a subsequent boot.

At block 410, the example task controller 302 and/or the BIOS 112 executes the task on a processor component. For example, during an initial boot, the BIOS 112 may execute all boot tasks on the core(s) 104. For dynamic scheduling, the task controller 302 may cause the task to be performed on one or more of the core(s) 104 or the small device processor(s) 106 to be able to gather information about the task being executed on the processor components. At block 412, the example performance determiner 304 and/or the categorizer 306 collects data corresponding to the task. For example, the performance determiner 304 can collect performance data (e.g., timing information, IPC, power usage information, etc.) for the task being executed on one or the core(s) 104 or the small device processor(s) 106. The example categorizer 306 may obtain operational information (e.g., via the interface 310) from the hardware agents that corresponds to whether a task included IO operations, memory operations (e.g., operations that access memory), and/or cache operations (e.g., operations the access cache).

At block 414, the example task controller 302 determines if a different processor component can be selected to execute the boot task. As described above, for dynamic scheduling a boot task needs to be executed on different processor component types to be able to compare the performance, timing, etc. to generate a processor component categorization. In some examples, the task can be executed in the different processor components during a single boot process. In some examples, the task can be executed in the different processor components during different boot processes.

If the example task controller 302 determines that a different processor component should be selected to execute the boot task (block 414: YES), the example task controller 302 selects the different processor component (e.g., if the task was first executed on the core 104, now execute on the small device processor 106) and control returns to block 410 to gather performance information based on the task being executed on the selected processor component. If the example task controller 302 determines that a different processor component should not be selected to execute the boot task (block 414: NO), the categorizer 306 categorizes the task based on the collected data (block 418). For example, for static schedule training, the categorizer 306 uses performance data of the task (e.g., timing data, IPCs, power usage data, etc.) to categorize the task as compute bound by comparing the performance data to one or more thresholds. If the categorizer 306 determines that the task should is not compute bound (e.g., the IPC is below a threshold, the power usage is below a threshold, etc.), the categorizer 306 can use the operational data from hardware agents to determine whether the task included memory operations, cache operations, and/or IO operations to be able to categorize the task as memory bound, cache bound, and/or IO bound. For dynamic schedule training, the categorizer 306 will have performance information for the task executed on the core 104 and the small device processor 106. Accordingly, the categorizer 306 can categorize the task to be performed on the core 104 or the small device processor 106 based on a comparison of the performance (e.g., to improve speed, reduce power, etc.) of the task on the core 104 or the small device processor 106.

At block 420, the example table entry controller 308 adds the categorization to the learning boot table 212 and control returns to block 406 to categorize a subsequent task. If there are no more tasks to categorization (block 406: NO), the example BIOS 112 stores the learning boot table 212 into non-volatile memory so that the learning boot table 212 can be utilized for subsequent boots.

FIG. 5 is a flowchart representative of example machine readable instructions and/or example operations 500 that may be executed and/or instantiated by processor circuitry to schedule boot tasks.

The machine readable instructions and/or operations 500 of FIG. 5 begin at block 502, at which the table entry processor 312 determines if the OS 108 has indicated an override of the boot processing using the learning boot table 212. For example, the OS 108 may wish to override use of the learning boot table when the computing device 100 is operating in a low power mode, has limited power capability, etc. If the table entry processor 312 determines that the OS 108 has overridden use of the learning boot table 212 (block 502: YES), the example table entry processor 312 indicates the override in the learning boot table (block 504) (e.g., so that the BIOS controller 314 and/or the BIOS 112 is aware of the override). At block 506, the example BIOS controller 314 and/or the BIOS 112 performs an alternative boot path devices by the OS 108 (block 506).

If the table entry processor 312 determines that the OS 108 has not overridden use of the learning boot table 212 (block 502: NO), the example table validator 316 determines if the learning boot table is valid using any data validation technique (block 508). If the example table validator 316 determines that the learning boot table is not valid (block 508: NO), the example agent 116 can perform learning boot table training in conjunction with the instructions 400 of FIG. 4. Additionally or alternatively, the example agent 116 can perform a default boot process in response to the learning boot table not being valid (e.g., perform all boot tasks on the core(s) 104). If the example table validator 316 determines that the learning boot table is valid (block 508: YES), the example table entry processor 312 identifies(s) identifiers of the tasks to be performed (block 512).

At block 514, the example BIOS controller 314 schedules the tasks to processor component(s) based on the corresponding entries of the example learning boot table 212. For example, if dynamic scheduling is active (e.g., based on preferences and/or the availability of processor component categorizations for boot tasks in the learning boot table 212), the BIOS controller 314 schedules the tasks according to the corresponding processor component categorization based on the corresponding task identifiers of the learning boot table 212. If static scheduling is active (e.g., based on preferences and/or the unavailability of processor component categorizations for boot tasks in the learning boot table 212), the BIOS controller 314 schedules the tasks according to the corresponding task categorization (e.g., compute bound/cache bound tasks on core(s) 104 and cache bound/IO bound tasks on small device processor(s) 106). In some examples, the BIOS controller 314 may perform hybrid scheduling, where one or more tasks are scheduling dynamically and one or more tasks are scheduled statically. In some examples, the BIOS controller 314 may ignore and/or override categorizations when resources are over/under utilized. For example, if all or most of the tasks are scheduled for the core(s) 104 and none or a limited number of tasks are scheduled for small device processor(s) 106, the BIOS controller 314 may schedule one or more of the tasks corresponding to the core(s) 104 (e.g., based on the learning boot table categorizations) to the small device processor(s) 106 to increase the efficiency of the utilization of the core(s) 104 and small device processor(s) 106.

At block 516, the example BIOS 112 performs the boot path (e.g., process) by executing the tasks on the corresponding processor component based on the schedule. At block 518, the example BIOS 112 synchronizes the components in preparation for returning control back to the OS 108. At block 520, the example BIOS passes the payload over to the OS 108 to return control back to the OS 108.

Figure 6:
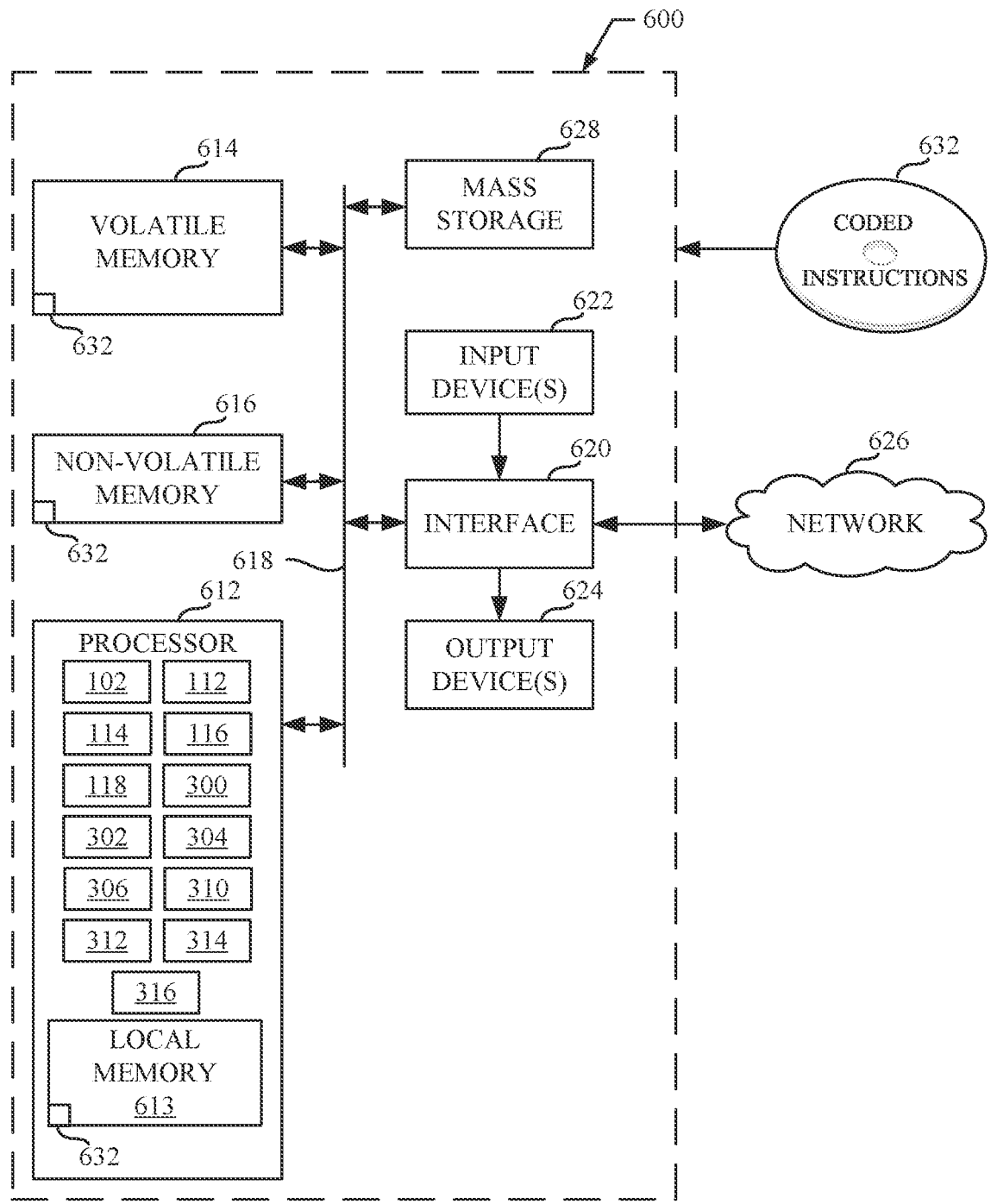
FIG. 6 is a block diagram of an example processing platform including processor circuitry structured to execute the example machine readable instructions of FIGS. 4 and/or 5 to implement the example computing device of FIG. 1.

FIG. 6 is a block diagram of an example processor platform 600 structured to execute and/or instantiate the machine readable instructions and/or operations of FIGS. 4 and/or 5 to implement the agent 116 and/or the scheduler 118 of FIG. 3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example CPU 102, the example BIOS 112, the example hybrid firmware 114, the example agent 116, the example scheduler 118, the example task identifier 300, the example task controller 302, the example performance determiner 304, the example categorizer 306, the example table entry controller 308, the example interface 310, the example interface 311, the example table entry processor 312, the example BIOS controller 314, and the example table validator 316

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIGS. 4 and/or 5, may be stored in the mass storage device 628, in the volatile memory 614, in the non-volatile memory 616, and/or on a removable non-transitory computer readable storage medium such as a CD or DVD.

Figure 7:
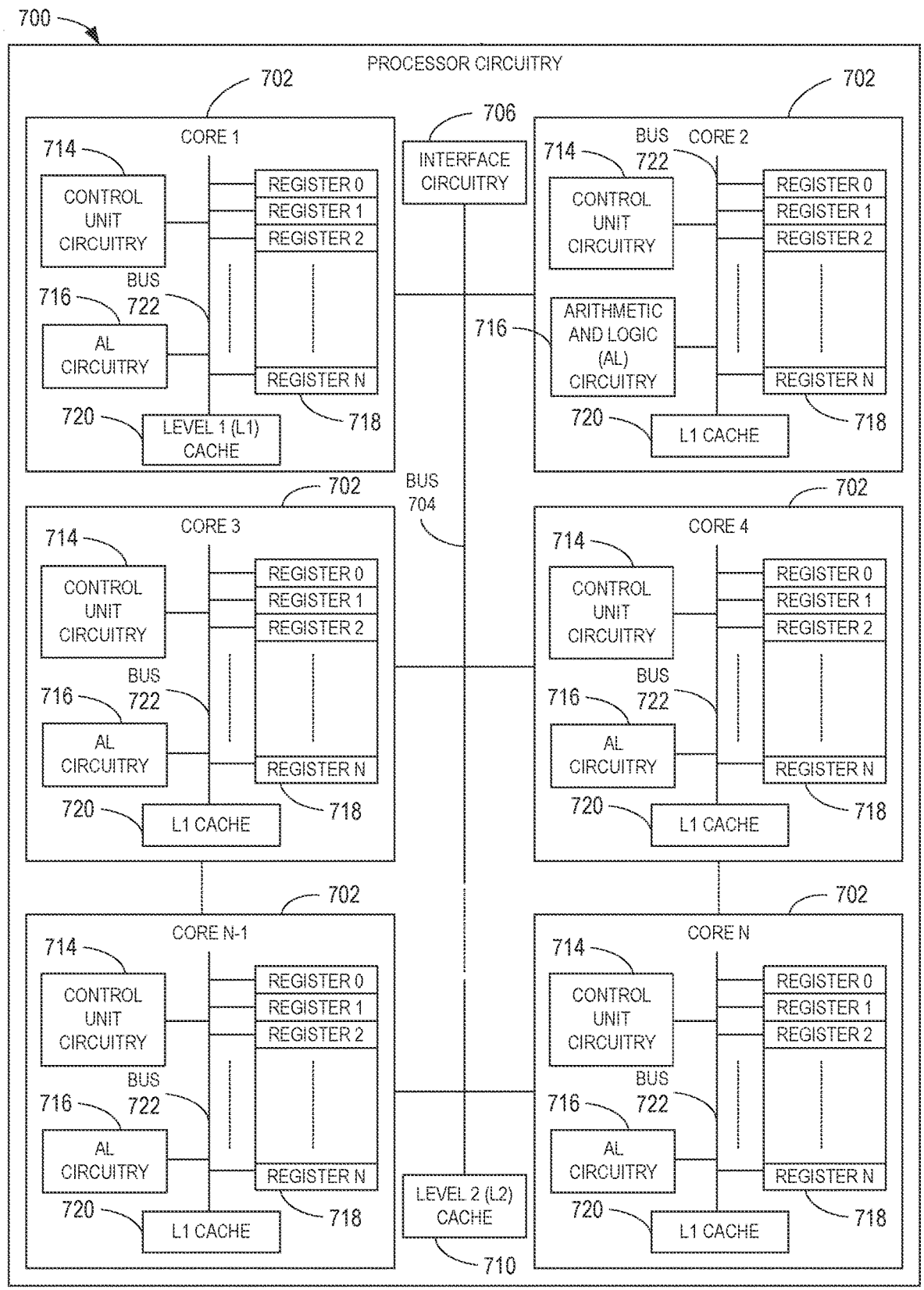
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor_00 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIGS. 4 and/or 5

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic, and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 720 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
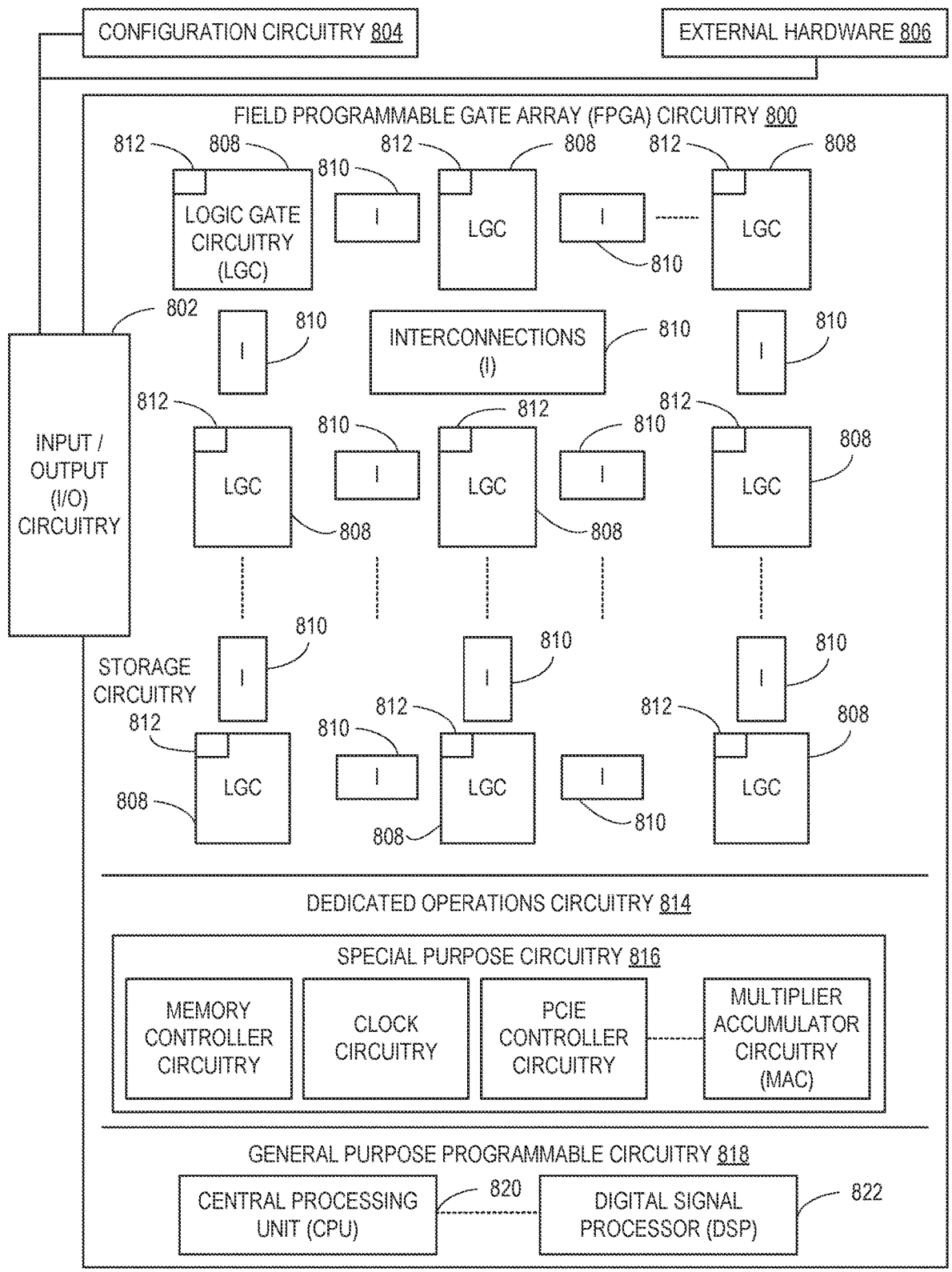
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIGS. 4-5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIGS. 4-5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIGS. 4-5. As such, the FPGA circuitry 800 may be structured to effectively instantiate some or all of the machine readable instructions of the flowchart of FIGS. 4-5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 8 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIGS. 4-5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an onboard CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIGS. 4-5 may be executed by one or more of the cores 702 of FIG. 7 and a second portion of the machine readable instructions represented by the flowchart of FIGS. 4-5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
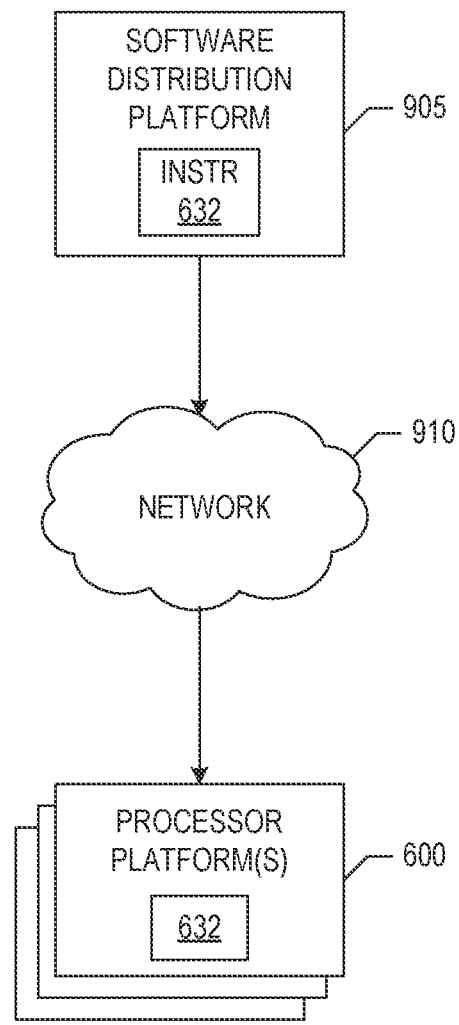
FIG. 9 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 400, 500 of FIGS. 4 and 5, as described above. The one or more servers of the example software distribution platform 905 are in communication with a network 910, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 400, 500 of FIGS. 4-5, may be downloaded to the example processor platform 600, which is to execute the machine readable instructions 632 to implement the agent 116 and/or the scheduler 118. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

Example methods, apparatus, systems, and articles of manufacture to increase boot performance are disclosed herein. Further examples and combinations thereof include the following: An apparatus to categorize boot tasks, the apparatus comprising example 1 includes instructions in the apparatus, and processor circuitry to execute the instructions to during a boot process identify a boot task that is to be performed during the boot process, execute the boot task using a first processor component, collect data corresponding to the execution of the boot task on the first processor component, categorize the boot task based on the collected data, and generate an entry for a boot table based on the categorization, the boot table used to schedule the boot task on at least one of the first processor component or a second processor component different than the first processor component based on the categorization.

Example 2 includes the apparatus of example 1, wherein the first processor component is a core processor and the second processor component is an small device processor.

Example 3 includes the apparatus of example 1, wherein the categorization corresponds to whether to schedule the boot task on the first processor component or the second processor component.

Example 4 includes the apparatus of example 1, wherein the data corresponds to at least one of performance data of the boot task executed on the first processor component or operational data from a hardware agent.

Example 5 includes the apparatus of example 1, wherein the boot process is a first boot process, the data is first data, and the categorization is a first categorization, the processor circuitry to, during a second boot process identify that the boot task is to be performed during the second boot process, execute the boot task using the second processor component, collect second data corresponding to the execution of the boot task on the second processor component, compare the first data with the second data, generate a second categorization of the boot task based on the comparison, and update the entry for the boot table based on the second categorization.

Example 6 includes the apparatus of example 5, wherein the first categorization is a task categorization and the second categorization is a processor component categorization.

Example 7 includes the apparatus of example 6, wherein the task categorization is at least one of compute bound, memory bound, cache bound, or input output bound.

Example 8 includes the apparatus of example 1, wherein the processor circuitry is to, during a subsequent boot process access the boot table, and schedule a second boot task of the subsequent boot process based on a categorization of from the boot table that corresponds to the second boot task.

Example 9 includes a non-transitory computer readable storage medium comprising instructions which, when executed, cause one or more processors to at least during a boot process identify a boot task that is to be performed during the boot process, execute the boot task using a first processor component, collect data corresponding to the execution of the boot task on the first processor component, categorize the boot task based on the collected data, and generate an entry for a boot table based on the categorization, the boot table used to schedule the boot task on at least one of the first processor component or a second processor component different than the first processor component based on the categorization.

Example 10 includes the non-transitory computer readable medium of example 9, wherein the first processor component is a core processor and the second processor component is an small device processor.

Example 11 includes the non-transitory computer readable medium of example 9, wherein the categorization corresponds to whether to schedule the boot task on the first processor component or the second processor component.

Example 12 includes the non-transitory computer readable medium of example 9, wherein the data corresponds to at least one of performance data of the boot task executed on the first processor component or operational data from a hardware agent.

Example 13 includes the non-transitory computer readable medium of example 9, wherein the boot process is a first boot process, the data is first data, and the categorization is a first categorization, the instructions to cause the one or more processors to, during a second boot process identify that the boot task is to be performed during the second boot process, execute the boot task using the second processor component, collect second data corresponding to the execution of the boot task on the second processor component, compare the first data with the second data, generate a second categorization of the boot task based on the comparison, and update the entry for the boot table based on the second categorization.

Example 14 includes the non-transitory computer readable medium of example 13, wherein the first categorization is a task categorization and the second categorization is a processor component categorization.

Example 15 includes the non-transitory computer readable medium of example 14, wherein the task categorization is at least one of compute bound, memory bound, cache bound, or input output bound.

Example 16 includes the non-transitory computer readable medium of example 9, wherein the instructions cause the one or more processors to, during a subsequent boot process access the boot table, and schedule a second boot task of the subsequent boot process based on a categorization of from the boot table that corresponds to the second boot task.

Example 17 includes an apparatus to categorize boot tasks, the apparatus comprising task identification circuitry to, during a boot process, identify a boot task that is to be performed during the boot process, task control circuitry to cause execution the boot task using a first processor component, categorization circuitry to collect data corresponding to the execution of the boot task on the first processor component, and categorize the boot task based on the collected data, and table entry circuitry to generate an entry for a boot table based on the categorization, the boot table used to schedule the boot task on at least one of the first processor component or a second processor component different than the first processor component based on the categorization.

Example 18 includes the apparatus of example 17, wherein the first processor component is a core processor and the second processor component is a small device processor.

Example 19 includes the apparatus of example 17, wherein the categorization corresponds to whether to schedule the boot task on the first processor component or the second processor component.

Example 20 includes the apparatus of example 17, wherein the data corresponds to at least one of performance data of the boot task executed on the first processor component or operational data from a hardware agent.

Example 21 includes the apparatus of example 17, wherein the boot process is a first boot process, the data is first data, and the categorization is a first categorization, wherein the task identification circuitry is to, during a second boot process, identify that the boot task is to be performed during the second boot process, the task control circuitry is to execute the boot task using the second processor component, the categorization circuitry is to collect second data corresponding to the execution of the boot task on the second processor component, and compare the first data with the second data, and the table entry circuitry is to generate a second categorization of the boot task based on the comparison, and update the entry for the boot table based on the second categorization.

Example 22 includes the apparatus of example 21, wherein the first categorization is a task categorization and the second categorization is a processor component categorization.

Example 23 includes the apparatus of example 22, wherein the task categorization is at least one of compute bound, memory bound, cache bound, or input output bound.

Example 24 includes the apparatus of example 17, further including an interface to, during a subsequent boot process, access the boot table, and bios control circuitry to schedule a second boot task of the subsequent boot process based on a categorization of from the boot table that corresponds to the second boot task.

From the foregoing, it will be appreciated that example systems, methods, apparatus, and articles of manufacture have been disclosed that increases boot performance. The disclosed systems, methods, apparatus, and articles of manufacture improve the efficiency of using a computing device by executing boot tasks with processor components during a boot based on a learning boot table that result in increased speed, increased performance, and/or decreased power usage of a boot process. The learning boot table is developed during a training phase, where the performance of tasks are evaluated on one or more processor component types to determine which processor component type is best for each task. In this manner, during subsequent boots, the ideal processor component type can be used for each boot task to increase performance. The disclosed systems, methods, apparatus, and articles of manufacture are accordingly directed to one or more improvement(s) in the operation of a machine such as a computer or other electronic.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to categorize boot tasks, the apparatus comprising:
   instructions in the apparatus; and
   processor circuitry to execute the instructions to:
      during a boot process:
         identify a boot task that is to be performed during the boot process;
         execute the boot task using a first processor component;
         execute the boot task using a second processor component, the second processor component being smaller than the first processor component;
         collect first performance data corresponding to the execution of the boot task using the first processor component;
         collect second performance data corresponding to the execution of the boot task using the second processor component;
         categorize the boot task based on the first and second performance data; and
         generate an entry for a boot table based on the categorization, the boot table used to schedule the boot task on at least one of the first processor component or the second processor component based on the categorization.

2. The apparatus of claim 1, wherein the first processor component is structured for higher performance than the second processor component.

3. The apparatus of claim 1, wherein the categorization corresponds to whether to schedule the boot task on the first processor component or the second processor component.

4. The apparatus of claim 1, wherein the first performance data corresponds to operational data from a hardware agent.

5. The apparatus of claim 1, wherein the boot process is a first boot process and the categorization is a first categorization, the processor circuitry to, during a second boot process:
   identify that the boot task is to be performed during the second boot process;
   execute the boot task using the second processor component;
   collect third performance data corresponding to the execution of the boot task on the second processor component;
   compare the first performance data with the third performance data;
   generate a second categorization of the boot task based on the comparison; and
   update the entry for the boot table based on the second categorization.

6. The apparatus of claim 1, wherein the first processor component is a big core and the second processor component is a little core.

7. The apparatus of claim 1, wherein the processor circuitry is to, during a subsequent boot process:
   access the boot table; and
   schedule a second boot task of the subsequent boot process based on a categorization of from the boot table that corresponds to the second boot task.

8. The apparatus of claim 5, wherein the first categorization is a task categorization and the second categorization is a processor component categorization.

9. The apparatus of claim 8, wherein the task categorization is at least one of compute bound, memory bound, cache bound, or input output bound.

10. A non-transitory computer readable storage medium comprising instructions which, when executed, cause one or more processors to at least:
    during a boot process:
      identify a boot task that is to be performed during the boot process;
      execute the boot task using a performance processor component;
      execute the boot task using an efficiency processor component;
      collect first performance data corresponding to the execution of the boot task using the performance processor component;
      collect second performance data corresponding to the execution of the boot task using the efficiency processor component;
      categorize the boot task based on the first and second performance data; and
      generate an entry for a boot table based on the categorization, the boot table used to schedule the boot task on at least one of the performance processor component or the efficiency processor component based on the categorization.

11. The non-transitory computer readable medium of claim 10, wherein the performance processor component consumes more power than the efficiency processor component.

12. The non-transitory computer readable medium of claim 10, wherein the categorization corresponds to whether to schedule the boot task on the performance processor component or the efficiency processor component.

13. The non-transitory computer readable medium of claim 10, wherein the first performance data corresponds to operational data from a hardware agent.

14. The non-transitory computer readable medium of claim 10, wherein the boot process is a first boot process and the categorization is a first categorization, the instructions to cause the one or more processors to, during a second boot process:
    identify that the boot task is to be performed during the second boot process;
    execute the boot task using the efficiency processor component;
    collect third performance data corresponding to the execution of the boot task on the efficiency processor component;
    compare the first performance data with the third performance data;
    generate a second categorization of the boot task based on the comparison; and
    update the entry for the boot table based on the second categorization.

15. The non-transitory computer readable medium of claim 10, wherein the instructions cause the one or more processors to, during a subsequent boot process:
    access the boot table; and
    schedule a second boot task of the subsequent boot process based on a categorization of from the boot table that corresponds to the second boot task.

16. The non-transitory computer readable medium of claim 14, wherein the first categorization is a task categorization and the second categorization is a processor component categorization.

17. The non-transitory computer readable medium of claim 16, wherein the task categorization is at least one of compute bound, memory bound, cache bound, or input output bound.

18. An apparatus to categorize boot tasks, the apparatus comprising:
    task identification circuitry to, during a boot process, identify a boot task that is to be performed during the boot process;
    task control circuitry to:
      cause execution the boot task using a first processor component designed for performance;
      cause execution the boot task using a second processor component designed for efficiency;
    categorization circuitry to:
      collect first performance data corresponding to the execution of the boot task using the first processor component; and
      collect second performance data corresponding to the execution of the boot task using the second processor component;
      categorize the boot task based on the first and second performance data; and
    table entry circuitry to generate an entry for a boot table based on the categorization, the boot table used to schedule the boot task on at least one of the first processor component or the second processor component based on the categorization.

19. The apparatus of claim 18, wherein the first processor component has a larger footprint than the second processor component.

20. The apparatus of claim 18, wherein the categorization corresponds to whether to schedule the boot task on the first processor component or the second processor component.

21. The apparatus of claim 18, wherein the first performance data corresponds to operational data from a hardware agent.

22. The apparatus of claim 18, wherein the boot process is a first boot process and the categorization is a first categorization, wherein:
the task identification circuitry is to, during a second boot process, identify that the boot task is to be performed during the second boot process;
the task control circuitry is to execute the boot task using the second processor component;
the categorization circuitry is to:
collect third performance data corresponding to the execution of the boot task on the second processor component; and
compare the first performance data with the performance second data; and
the table entry circuitry is to:
generate a second categorization of the boot task based on the comparison; and
update the entry for the boot table based on the second categorization.

23. The apparatus of claim 18, further including:
an interface to, during a subsequent boot process, access the boot table; and
basic input/output system (BIOS) control circuitry to schedule a second boot task of the subsequent boot process based on a categorization of from the boot table that corresponds to the second boot task.

24. The apparatus of claim 22, wherein the first categorization is a task categorization and the second categorization is a processor component categorization.

* * * * *